United States Patent
Filichev (10) Patent No.: US 11,507,542 B2
(45) Date of Patent: Nov. 22, 2022

(54) SYNCHRONIZATION CONTROL OF FILE FOLDERS IN COMPUTING SYSTEMS

(71) Applicant: Microsoft Technology Licensing, LLC, Redmond, WA (US)

(72) Inventor: Timofey Filichev, Kenmore, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/136,842

(22) Filed: Dec. 29, 2020

(65) Prior Publication Data

US 2022/0206997 A1 Jun. 30, 2022

(51) Int. Cl.
G06F 16/178 (2019.01)
H04L 51/42 (2022.01)
G06F 16/11 (2019.01)

(52) U.S. Cl.
CPC .......... *G06F 16/178* (2019.01); *G06F 16/122* (2019.01); *H04L 51/42* (2022.05)

(58) Field of Classification Search
CPC ....... G06F 16/178; G06F 16/122; H04L 51/22
See application file for complete search history.

(56) References Cited

U.S. PATENT DOCUMENTS

| | | | |
|---|---|---|---|
| 6,636,897 B1 | 10/2003 | Sherman et al. | |
| 6,725,239 B2 | 4/2004 | Sherman et al. | |
| 10,033,680 B2 | 7/2018 | Bryant et al. | |
| 10,277,549 B2 | 4/2019 | Jhaveri et al. | |
| 10,397,160 B2 | 8/2019 | Brown et al. | |
| 2003/0195950 A1* | 10/2003 | Huang | G06F 16/9535 709/219 |
| 2012/0005283 A1 | 1/2012 | Provo et al. | |
| 2013/0041968 A1 | 2/2013 | Cohen et al. | |
| 2017/0054667 A1* | 2/2017 | Brown | H04L 67/1095 |

(Continued)

FOREIGN PATENT DOCUMENTS

EP 3133780 A1 2/2017

OTHER PUBLICATIONS

"Synchronizing a Folder Hierarchy", Retrieved from: https://docs.microsoft.com/en-us/openspecs/exchange_server_protocols/ms-ascmd/62005264-69bd-4256-8fc9-00a33862eb6d, Oct. 14, 2020, 2 Pages.

(Continued)

*Primary Examiner* — Cam Y T Truong
(74) *Attorney, Agent, or Firm* — Ray Quinney & Nebeker P.C; James Bullough (57) ABSTRACT

Techniques for synchronization control of file folders in computing systems are discloses herein. In one example, a method includes receiving data representing signals indicating an interaction of a user with a file in a first folder or has interreacted with the first folder directly and a failure of performing a synchronization operation between a second folder at the first server and a corresponding folder at the second server. The method can then include increasing a synchronization priority of the first folder relative to that of the second folder according to the received signals and synchronizing the first folder at the first server with another corresponding folder at the second server and the second folder at the first server with the corresponding folder at the second server according to the increased relative synchronization priority of the first folder over the second folder.

20 Claims, 6 Drawing Sheets

(56) References Cited

U.S. PATENT DOCUMENTS

2017/0118157 A1\* 4/2017 Bryant ................ H04W 56/001
2019/0121805 A1\* 4/2019 Bank ................... G06F 16/2423
2020/0319694 A1 10/2020 Mohanty et al.

OTHER PUBLICATIONS

Holizman, Jim, "Server-side synchronization", Retrieved from: https://docs.microsoft.com/en-us/power-platform/admin/server-side-synchronization, Sep. 9, 2020, 5 Pages.
"International Search Report and Written Opinion issued in PCT Application No. PCT/US21/062291", dated Mar. 4, 2022, 11 Pages.

\* cited by examiner

SYNCHRONIZATION CONTROL OF FILE FOLDERS IN COMPUTING SYSTEMS

BACKGROUND

Electronic Mail or email is a technique of exchanging messages between users using computers, tablets, smart phones, or other suitable types of electronic devices. Email exchanges operate across computer networks such as the Internet or an intranet. Today's email systems are typically based on a store-and-forward model utilizing email servers to accept, forward, transmit, and store email messages. Users can connect to email servers using computers or mobile devices to access email messages in electronic mailboxes via a computer network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Users sometimes use a third-party application to access electronic mailboxes. For instance, a user can use a mobile app on a smartphone to access the user's mailbox hosted and managed by a first email provider. The mobile app, however, may be provided by a second email provider who has no direct control over the user's electronic mailbox at the first email provider. Instead of directly accessing email servers of the first email provider, the mobile app can access a "mirror" electronic mailbox at the second email provider replicated from a source electronic mailbox at the first email provider. Optionally, the second email provider can also add control data or metadata to the replicated email messages to provide additional functionalities suitable for the mobile app. The mobile app can then access the mirror electronic mailbox at the second email provider to retrieve, surface, and/or provide access to the email messages to the user.

The mailbox replication technique described above, however, may cause certain issues when indirectly accessing the user's email messages via the mirror electronic mailbox at the first email provider. Typically, an electronic mailbox is organized as multiple email folders such as "Inbox," "Sent," "Outbox," "Junk email," and "Deleted items." The user can also create customized email folders such as for different types, categories, topics, groups, projects, departments, etc. As such, the source electronic mailbox can sometimes include hundreds if not thousands of email folders. During operation, the second email provider synchronizes the various email folders at the source and mirror electronic mailboxes by transmitting synchronization requests to the first email provider and update corresponding email folders with received responses from the first email provider.

Sometimes, however, the mobile app may appear unable to receive/sent email messages due to synchronization issues between the first and second email providers. For example, the second email provider may appear "stuck" on synchronizing email messages in a first email folder while the user is attempting to access new messages in a second email folder. The first email folder may contain many email messages and/or email messages with large-size attachments, such as video files. As such, synchronization of the second email folder can be delayed because synchronizing the first email folder takes a long time to complete. As such, while the second email folder at the source electronic mailbox may contain new messages, the user would not have access to such new messages in the mirror electronic mailbox due to the synchronization delay between the first and second email providers. Thus, the mobile app may appear to have failed to update email messages in the second email folder.

In another example, synchronization of the source and mirror electronic mailboxes at the first and second email providers, respectively, may also fail for various reasons. For instance, the first email provider may allow hosting of files of certain types, sizes, file names, and/or other attributes that are not allowed by the second email provider. As such, synchronization of the first email folder with email messages of such attributes would fail. In response, the second email provider may attempt to resynchronize the first email folder by submitting repeated synchronization requests. However, throttling rules implemented at the first email provider can limit how often the second email provider (or other email providers) can submit such synchronization requests. Thus, the repeated synchronization requests by the second email provider can cause the first email provider to suspend the synchronization of the first email folder by, for instance, setting a retry delay. As a result, the second email folder with new messages may not be synchronized in a timely fashion between the source and mirror electronic mailboxes. Thus, the mobile app may also appear to have failed to update for new messages. The synchronization issues described above can thus negatively impact user experience with the mobile app as well as incurring resource consumptions (e.g., storage, network bandwidth, and/or processor usage) at both email servers at both the first and second email providers.

Several embodiments of the disclosed technology can address certain aspects of the foregoing drawbacks by implementing a real-time prioritization of email folders in an electronic mailbox based on signals of user interactions, server synchronization conditions, backend processing conditions at the second email provider, and/or other suitable operating status of the electronic mailbox. In certain implementations, a prioritization controller can be configured to track various client-side signals indicating interactions between a user and certain email folders in the mirror electronic mailbox. Example client-side interactions can include:

User selects (e.g., clicked on) an email folder in the mobile app;
User performs an action on an email message (e.g., marked email as "read") in an email folder; or
The mobile app signals to explicitly synchronize an email folder (e.g., when user added the email folder to "Favorites" list).

The prioritization controller can also be configured to track server-side interaction signals indicating a synchronization and/or processing condition/status of the email folders. Example server-side interaction signals can include:

Transient/permanent failures that occurred while performing operations on an email folder or email messages contained therein (e.g., constantly failing to direct-synchronize due to a faulty source email message or replay-synchronization);
Reception of throttling responses while performing operations on an email folder (e.g., when attempts to synchronize an email folder results in "Please try again later" responses);
Synchronization of an email folder resulting in too many items or replay actions (e.g., syncing a Spam folder with many items arriving from different sources); or Back-end processing workload (e.g., spam-filters, Focused Inbox view separation, data parsing assistance) on various email folders.

In any of the foregoing embodiments, the prioritization controller can also be configured to track a lack of interactions or "inactivity" of certain interactions or conditions. For example, the prioritization controller can be configured to track that a user has not selected an email folder or interacted with an email message in the email folder for a threshold amount of time. In another example, the prioritization controller can also be configured to track that no transient/permanent failures have been detected while performing operations on an email folder for another threshold amount of time. Based on such tracked inactivity, the prioritization controller can be configured to derive or assign interaction scores, either positive or negative, to the detected interactions and/or inactivity, as described in more detail below.

Using the tracked interaction signals or inactivity, the prioritization controller can be configured to derive a prioritization score for each of the email folders in the mirror electronic mailbox. In certain embodiments, the individual tracked interactions signals can be assigned an interaction score based on certain criteria. For example, when a user selects an email folder, the prioritization controller can assign a numerical score (e.g., five) to the tracked interaction indicating positive interaction. In another example, when a user performs an action on an email message, the prioritization controller can assign another numerical score (e.g., ten) to the email folder that holds the email message. On the other hand, when the user has not selected the email folder or interacted with an email message in the email folder, the prioritization controller can assign another numerical score (e.g., minus two) to the email folder for inactivity indicating negative interaction.

In a further example, when the mobile app signals to add an email folder to "Favorites" list, the prioritization controller can assign yet another numerical value corresponding to the email folder according to the tracked interactions. In yet further examples, when any of the following is detected while performing an operation on an email folder, the prioritization controller can assign a numerical value (e.g., minus ten) to the email folder indicating operational difficulties:

Detection of a transient/permanent failure;
Reception of a throttling response;
Number of items exceeds a threshold; or
Back-end processing workload exceeds a threshold.

On the other hand, the prioritization can assign another numerical value (e.g., positive five) when one or more of the foregoing interactions have not been detected for a threshold amount of time indicating a lack of operational difficulties. In at least some of the foregoing examples, the prioritization controller can be configured to adjust the assigned interaction scores as a function of time, frequency, recency, or other suitable criteria. Thus, in certain instances, as time elapses, the assigned interaction score to a tracked interaction (e.g., user selects an email folder) can continuously decrease until reaching a floor value (e.g., zero) or continue to negative numbers without being limited by a floor value.

With the interaction scores, the prioritization controller can be configured to derive the prioritization score. In certain embodiments, the prioritization controller can sum all the assigned interaction scores to derive an overall prioritization score. In other embodiments, at least some of the assigned interaction scores can have corresponding weights toward the overall prioritization score. As such, an administrator or other suitable entities can adjust the weights to emphasis importance of certain interaction signals. For example, an administrator may set higher weights for server-side interaction signals when compared to client-side interaction signals, or vice versa. In certain implementations, the prioritization controller can be configured to adjust the prioritization score in real time. As such, when an interaction signal is received, the prioritization controller can be configured to recalculate the prioritization score in response to receiving the interaction signal. In other implementations, the prioritization controller can be configured to also adjust the previously calculated prioritization score periodically or in other suitable manners. For example, as time elapses, the prioritization controller can periodically decrease certain interaction scores of previously detected interactions to result in decreasing overall prioritization scores. The decreased prioritization scores can result in a new and/or different synchronization profile for the email folder corresponding to the decreased prioritization scores, as described in more detail below.

The prioritization controller can also be configured to implement different synchronization rules and adjust the implemented synchronization rules for individual email folders based on corresponding prioritization scores of these email folders. For example, the prioritization controller can be configured to determine whether a prioritization score of an email folder exceeds a threshold. In response to determine that the prioritization score exceeds the threshold, the prioritization controller can mark the email folder to be synchronized. Otherwise, the prioritization controller can mark the email folder to be not synchronized. In another example, in response to determine that the prioritization score exceeds the threshold, the prioritization controller can mark the email folder to be synchronized at a higher frequency (e.g., once an hour) than a frequency (e.g., once a day) for other email folders with prioritization scores below the threshold. In further examples, the prioritization controller can also be configured to sort the email folders into a priority sequence according to the prioritization scores and instruct the email servers to synchronize the email folders in the mirror electronic mailbox using the priority sequence. In yet further examples, the prioritization controller can be configured to exclude or delay synchronization of email folder(s) that continue to experience failures or other operational difficulties, such as failure to synchronize, high processing workload, etc.

Several embodiments of the disclosed technology can improve user experience when using the mobile app. By prioritizing synchronization of email folders using the client-side interaction signals, email folders most often used by users can be synchronized more frequent or faster than other email folders. As such, the email folders that are most often used can stay up to date with small or no synchronization delays. In addition, by not synchronizing email folders often unused by users for a long time, the first and second email providers can save storage, computing, network, or other suitable types of resources at corresponding email servers. Also, by synchronizing a reduced number of email folders, synchronization latencies of the email folders can also be reduced. As such, the mobile app can appear to be more responsive than synchronizing all email folders.

DETAILED DESCRIPTION

Certain embodiments of systems, devices, components, modules, routines, data structures, and processes for synchronization control of file folders in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

In the following description, an email server can include a computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more electronic mailboxes for corresponding users. An electronic mailbox can include a logical a computer file structure in which electronic mails of a user are collected. An electronic mailbox can also include subordinate file structures such as file folders or email folders that individually include a subset of the emails of the user.

When a user uses a thirty-party application to access emails hosted by a first email provider, a second email provider of the application can create a mirror electronic mailbox that is a replication of that at the first email provider. The mailbox replication technique, however, can create certain operational issues due to synchronization between the original and the mirror electronic mailboxes. For instance, the second email provider may be synchronizing a first folder while the user is attempting to access a second folder. In another instance, synchronization of the first folder may fail, and thus rendering the synchronization process paused or terminated. Such operations issues can render the application unresponsive and negatively impact user experience. The operational issues can also incur large amount of storage, computing, network, or other types of resources at both the first and second email providers.

Several embodiments of the disclosed technology can address certain aspects of the foregoing drawbacks by implementing a real-time prioritization of email folders in an electronic mailbox based on user interactions, server synchronization conditions, and backend processing conditions at the second email provider. In example implementations, signals of the user interacting with emails or email folders, as well as synchronization status or conditions between the first and second email providers can be tracked. The tracked signals can be converted into numerical values and combined with or without weights into an aggregate prioritization score for each email folder. Suitable synchronization rules and/or sequences can then be applied to the email folders based on the prioritization scores. As such, email folders that the user interacts more often can be synchronized at higher frequency than others. Email folders that continue to have synchronization issues can be deprioritized such that other email folders can be synchronized first and/or at higher frequencies. Thus, email services via the mobile app can appear to be more responsive than randomly synchronizing email folders while computing resources at the first and second email providers can be reduced, as described in more detail below with reference to FIGS. 1A-5.

Though various aspects of the disclosed technology are described below in the context of email folder synchronization control, in other implementations, at least some aspects of the disclosed technology can also be applied to synchronizing other types of folders. For example, a user may store large amount data representing documents or other types of files in many folders on a File Management System (FMS). The FMS can be configured to track user interaction with the stored files or file folders as well as backend processing loads of the files or file folders to determine prioritization of duplicate copies of the files and/or file folders. In other examples, aspects of the disclosed technology can also be applied in the context of synchronization control of text messages, online chats, or another suitable environment.

Figure 1A:
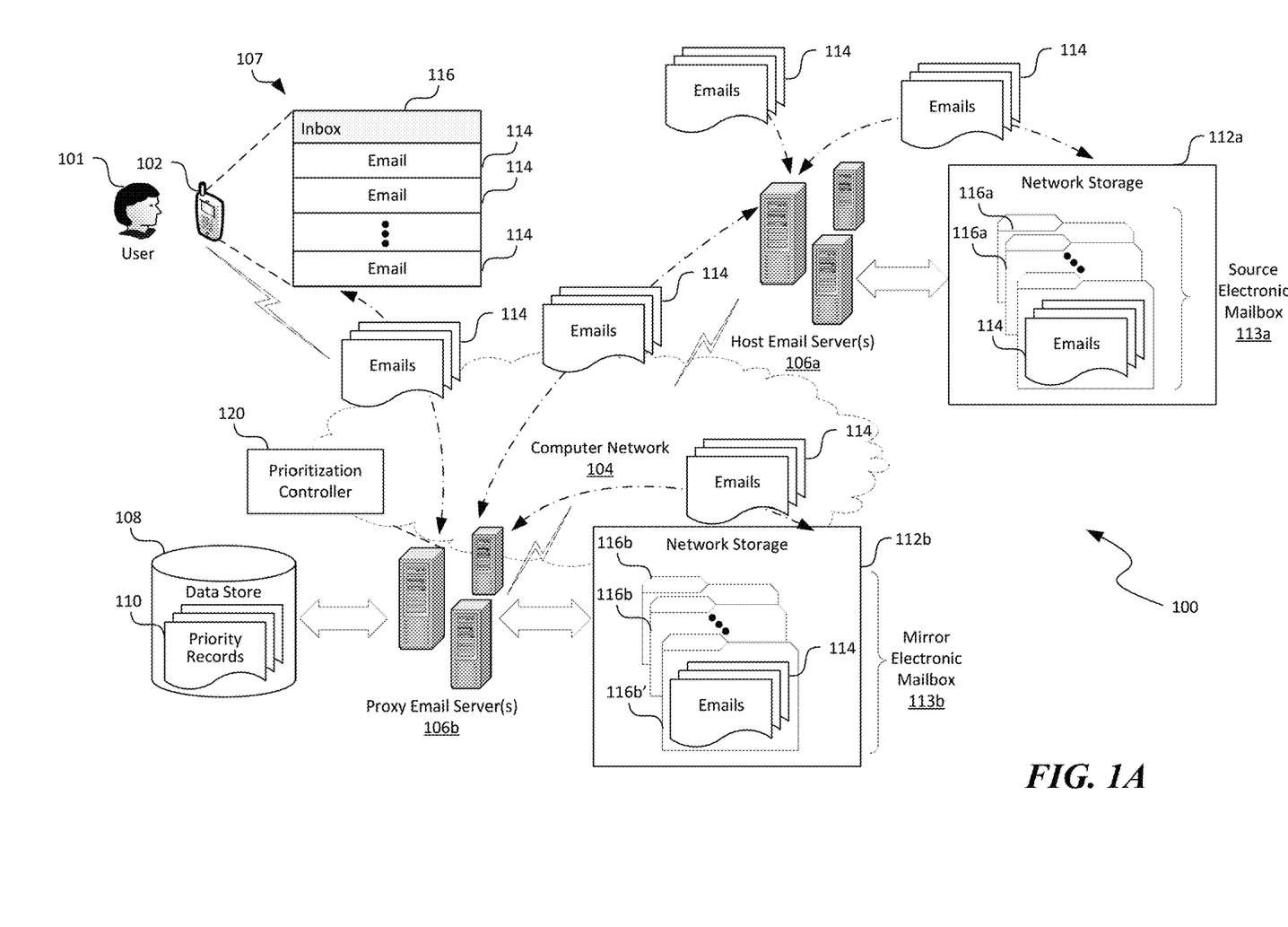
FIGS. 1A-1C are schematic diagrams illustrating a computing system implementing synchronization control of file folders in accordance with embodiments of the disclosed technology.

FIG. 1A is a schematic diagram illustrating a computing system 100 implementing synchronization control of file folders in accordance with embodiments of the disclosed technology. As shown in FIG. 1A, the computing system 100 can include a computer network 104 interconnecting a client device 102, a host email server 106a, and a proxy email server 106b. The host and proxy email servers 106a and 106b are also individually interconnected with a network storage 112a and 112b containing one or more folders 116a and 116b in a source electronic mailbox 113a and mirror electronic mailbox 113b which is a replication of the source electronic mailbox 113a. Each folder 116a and 116b can include a collection of emails 114. The proxy email server 106b is also operatively connected and a data store 108 containing priority records 110.

The computer network 104 can include an intranet, a wide area network, the Internet, or other suitable types of network. Even though particular components of the computing system 100 are shown in FIG. 1A, in other embodiments, the computing system 100 can also include additional and/or different components or arrangements. For example, the computing system 100 can also include additional network storage devices, additional hosts, and/or other suitable components (not shown). In other embodiments, the network storage 112a and 112b and/or the data store 108 may be integrated into respective host or proxy email servers 106a and 106b.

The client devices 102 can include a computing device that is configured to facilitate a user 101 to access computing services provided by the host and proxy email servers 106a and 106b via the computer network 104. For example, in the illustrated embodiment, the client devices 102 include a smartphone configured to execute suitable instructions to provide a mobile app 107 that allows the user 101 to view, reply, send, or perform other actions on emails 114. In the illustrated example, the emails 114 are in an Inbox folder 116. In other examples, the emails 114 can be in other suitable folders while the mobile app 107 provides facilities for the user 101 to switch between the folders to view corresponding emails 114. In other embodiments, the client devices 102 can also include laptops, tablets, gaming consoles, or other suitable computing devices. Even though a single user 101 is shown in FIG. 1A for illustration purposes, in other embodiments, the computing system 100 can facilitate any suitable numbers of users 101 to access suitable types of computing services provided by the host and/or proxy email servers 106a and 106b.

The host and proxy email servers 106a and 106b can be configured to facilitate email reception, storage, forwarding, and other related functionalities. For example, as shown in FIG. 1A, a sender (not shown) can generate and transmit an email 114 to the host email server 106a either directly or via other intermediate email servers (not shown). The email 114 is destined to the user 101 and can include an email header, an email body, and one or more optional attachments (not shown). Upon receiving the email 116 from the sender, the host email server 106a can store a copy of the email 114 in an electronic mailbox 113a on the network storage 112a that correspond to the user 101. As shown in FIG. 1A, the electronic mailbox 113a of the user 101 can include multiple folders 116a. Upon receiving the email 114, the host email server 106a can be configured to store the email 114 in one of the multiple folders 116a according to certain setup rules. For instance, the email 114 can be placed in an "Inbox" folder 116a of the electronic mailbox 113a. Alternatively, the email 114 may be placed in another folder 116a designated to store emails 114 from the sender.

In the illustrated scenario, the mobile app 107 can be provided by an email service provider (not shown) corresponding to the proxy email server 106b. As such, in order to allow the user 101 to access the emails 114 at the host email server 106a, the proxy email server 106b can replicate the source electronic mailbox 113a at the network storage 112a to the network storage 112b. As such, the network storage 112b can include a mirror electronic mailbox 113b that is a copy of the source electronic mailbox 113a having the same or similar folder structure. In operation, the proxy email server 106b can continuously, periodically, or on other suitable basis to synchronize the various folders 116b in the mirror electronic mailbox 113b with those in the source electronic mailbox 113a. For example, the proxy email server 106b can periodically transmit synchronization requests (not shown) to the host email server 106a for any changes in the folders 116a at the source electronic mailbox 113a. In response, the host email server 106a can provide the newly received email 114 from the sender to the proxy email server 106b. In turn, the proxy email server 106b can store a copy of the email 114 in a corresponding folder 116b and provide another copy of the email 114 to the mobile app 107 for surfacing to the user 101.

The mailbox replication technique described above, however, may cause certain issues when indirectly accessing the user's email 114 at the host email server 106a via the proxy email server 106b. As shown in FIG. 1A, the source and mirror electronic mailboxes 113a and 113b can be organized as multiple folders 116a and 116b such as "Inbox," "Sent," "Outbox," "Junk email," and "Deleted items." The user 101 can also create customized folders 116a and 116b such as for different types, categories, topics, groups, projects, departments, etc. As such, the source and mirror electronic mailboxes 113a and 113b can sometimes include hundreds if not thousands of folders 116a and 116b, respectively.

The large number of folders 116a and 116b may sometimes cause the mobile app 107 to appear unable to receive/sent email 114 due to synchronization issues between the host and proxy email servers 106a and 106b. For example, the proxy email server 106b may appear "stuck" on synchronizing emails 114 in a first folder 116b while the user 101 is attempting to access the new messages from the sender in a second folder 116b'. The first folder 116b may contain many emails 114 and/or emails 114 with large-size attachments, such as video files. As such, synchronization of the second folder 116b' can be delayed because synchronizing the first folder 116a takes a long time to complete. As such, while the second email folder 116b' at the source electronic mailbox 113a may contain new messages, the user 101 would not have access to such new messages in the mirror electronic mailbox 113b due to the synchronization delay. Thus, the mobile app 107 may appear to have failed to update emails 114 in the second email folder 116b'.

In another example, synchronization of the source and mirror electronic mailboxes 113a and 113b at the first and proxy email servers 106a and 106b, respectively, may also fail for various reasons. For instance, the host email server 106a may allow hosting of files of certain types, sizes, and/or other attributes that are not allowed by the proxy email server 106b. As such, synchronization of the first folder 116b with emails 114 of such attributes would fail. In response, the proxy email server 106b may attempt to resynchronize the first folder 116b by submitting repeated synchronization requests. However, throttling rules implemented at the host email server 106a can limit how often the proxy email server 106b (or other email providers) can submit such synchronization requests. Thus, the repeated synchronization requests by the proxy email server 106b can cause the host email server 106a to suspend the synchronization process by, for instance, setting a retry delay. As a result, the second email folder 116b' with new messages may not be synchronized in a timely fashion between the source and mirror electronic mailboxes 113a and 113b. Thus, the mobile app 107 may also appear to have failed to update. The synchronization issues described above can thus negatively impact user experience with the mobile app 107 as well as incurring large amounts of resource consumptions (e.g., storage, network bandwidth, and/or processor usage) at both host and proxy email servers 106a and 106b.

Several embodiments of the disclosed technology can address certain aspects of the foregoing drawbacks by implementing a real-time prioritization of the folders 116b at the network storage 112b based on user interactions, server synchronization conditions, and backend processing conditions at the proxy email server 106b. As shown in FIG. 1A, the computing system 100 can include a prioritization controller 120 configured to perform synchronization control of the folders 116b in the mirror electronic mailbox 113b with the folders 116a in the source electronic mailbox 113a. In one example, the prioritization controller 120 can be a component of the proxy email server 106b. In other examples, the prioritization controller 120 can be a component hosted on one or more additional servers (not shown) separate from the proxy email server 106b while still having access to priority records 110 in the data store 108.

Figure 1B:
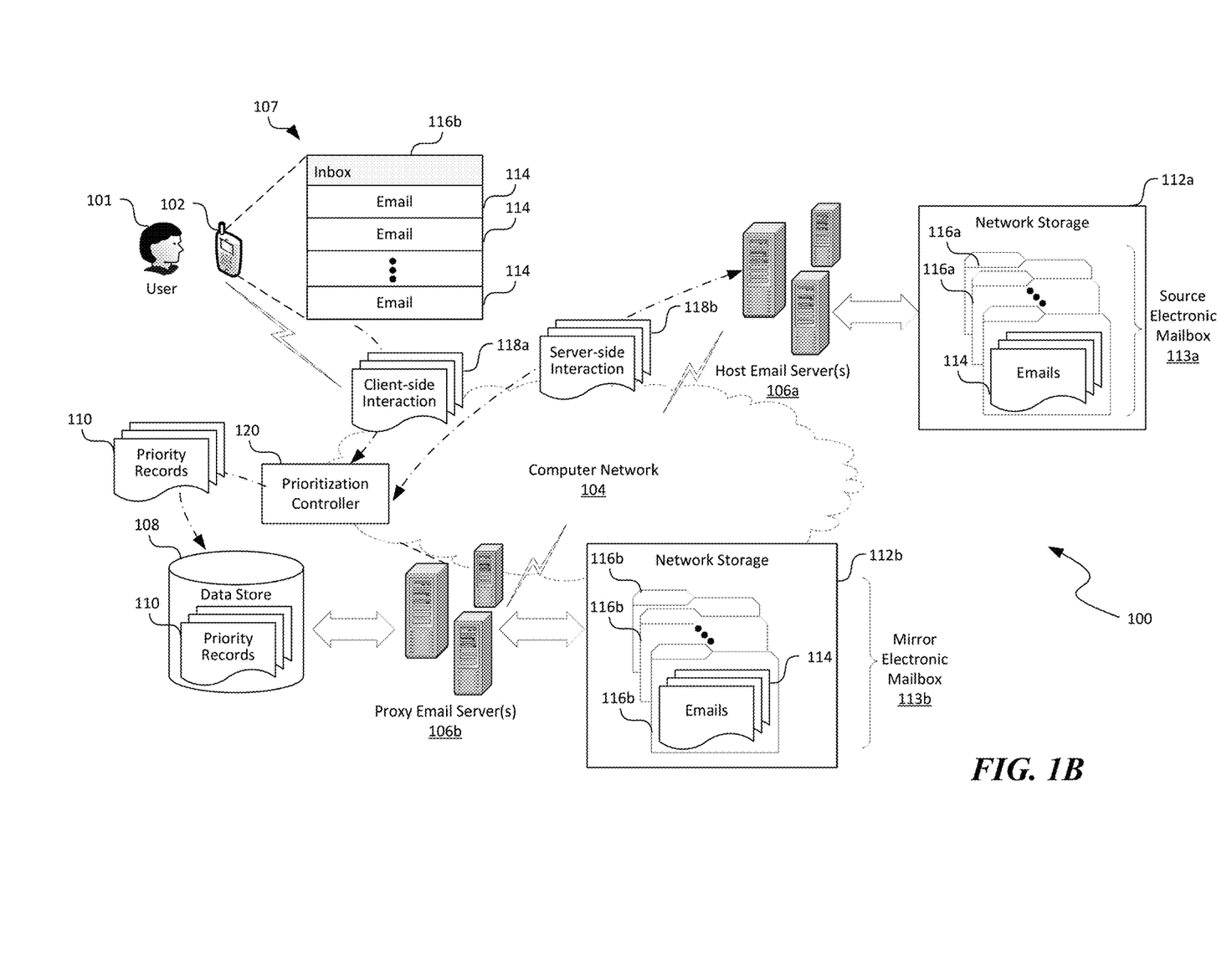

In accordance with embodiments of the disclosed technology, the prioritization controller 120 can be configured to control synchronization of the folders 116b int eh mirror electronic mailbox 113b by tracking various signals indicating user interactions, server synchronization conditions, and backend processing conditions at the proxy email server 106b. For example, as shown in FIG. 1B, the prioritization controller 120 can be configured to receive client-side interaction signals 118a. In certain embodiments, the client-side interaction signals 118a can be generated by an interaction agent (not shown) that is a component of the mobile app 107. Upon detecting user interactions with the emails 114 and/or folders 116b, the interaction agent can be configured to generate, store, and transmit data indicating the detected interactions to the prioritization controller 120. Example client-side interactions can include:

User selects (e.g., clicked on) an email folder in the mobile app;

User performs an action on an email message (e.g., marked email as "read") in an email folder; or The mobile app signals to explicitly synchronize an email folder (e.g., when user added the email folder to "Favorites" list)

In other embodiments, the client-side interaction signals 118a can be generated by the client device 102 in other suitable manners.

The prioritization controller 120 can also be configured to track server-side interaction signals 118b indicating a synchronization and/or processing condition of the folders 116b. Example server-side interaction signals 118b can include:

Transient/permanent failures that occurred while performing operations on a folder 116b or emails 114 contained therein (e.g., constantly failing to direct-synchronize due to a faulty source emails or replay-synchronization);

Reception of throttling responses from the host email server 106b while performing operations on a folder 116b (e.g., when attempts to synchronize a folder 116b results in "Please try again later" responses);

Synchronization of a folder 116b resulting in too many emails 114 or replay actions (e.g., syncing a Spam folder with many items arriving from different sources); or Back-end processing workload (e.g., spam-filters, Focused Inbox view separation, data parsing assistance) on various folders 116b.

In any of the foregoing embodiments, the prioritization controller 120 can also be configured to track a lack of interactions or "inactivity" of certain interactions. For example, the prioritization controller 120 can be configured to track that the user 101 has not selected an email folder 116b for a threshold amount of time. In another example, the prioritization controller 120 can also be configured to track that no transient/permanent failures have been detected while performing operations on an email folder 116b for another threshold amount of time. Based on such tracked inactivity, the prioritization controller 120 can be configured to derive or assign interaction scores, either positive or negative, to the detected interactions and/or inactivity, as described in more detail below.

Using the tracked client- and server-side interaction signals 118a and 118b, the prioritization controller 120 can be configured to derive a prioritization score for each of the folders 116b in the mirror electronic mailbox 113b. In certain embodiments, the individual tracked client- and server-side interactions signals 118a and 118b can be assigned an interaction score based on certain criteria. For example, when the user 101 selects a folder 116b, the prioritization controller 120 can assign a numerical score (e.g., five) to the tracked interaction. In another example, when the user 101 performs an action on an email 114, the prioritization controller 120 can assign another numerical score (e.g., ten) to the folder 116b that holds the email 114. On the other hand, when the user 101 has not selected the email folder 116b or interacted with an email 114 in the email folder, the prioritization controller 120 can assign another numerical score (e.g., minus two) to the email folder 116b for inactivity. In a further example, when the mobile app 107 can signal to add a folder 116b to "Favorites" list, the prioritization controller 120 can assign yet another numerical value to the folder 116b. In yet further examples, when any of the following is detected while performing an operation on a folder 116b, the prioritization controller 120 can assign a numerical value (e.g., minus ten) to the folder 116b:

Detection of a transient/permanent failure;

Reception of a throttling response;

Number of items exceeds a threshold; or

Back-end processing workload exceeds a threshold.

In at least some of the foregoing examples, the prioritization controller 120 can be configured to adjust the assigned interaction scores as a function of time, frequency, recency, or other suitable criteria. Thus, in certain instances, as time elapses, the assigned interaction score to a tracked interaction (e.g., user selects a folder) can continuously decrease until reaching a floor value (e.g., zero) or continue to negative numbers without being limited by a floor value.

With the interaction scores, the prioritization controller 120 can be configured to derive a prioritization score for each of the folders 116b in the mirror electronic mailbox 113b. In certain embodiments, the prioritization controller 120 can sum all the assigned interaction scores to derive an overall prioritization score. In other embodiments, at least some of the assigned interaction scores can have corresponding weights (e.g., from zero to one) toward the overall prioritization score. As such, an administrator (not shown) or other suitable entities can adjust the weights to emphasis importance of certain interaction signals. For example, an administrator may set higher weights for server-side interaction signals 118b compared to client-side interaction signals 118a, or vice versa. In certain implementations, the prioritization controller 120 can be configured to adjust the prioritization score in real time. As such, when a client- or server-side interaction signal 118a or 118b is received, the prioritization controller 120 can be configured to recalculate the prioritization score in response to receiving the client- or server-side interaction signal 118a or 118b. In other implementations, the prioritization controller 120 can be configured to adjust the prioritization score periodically or in other suitable manners. For example, as time elapses, the prioritization controller 120 can periodically decrease certain interaction scores of previously detected client- or server-side interaction signals 118a and 118b to result in decreasing overall prioritization scores. The decreased prioritization scores can result in a new and/or different synchronization profile for the email folders 116 corresponding to the decreased prioritization scores.

Figure 1C:
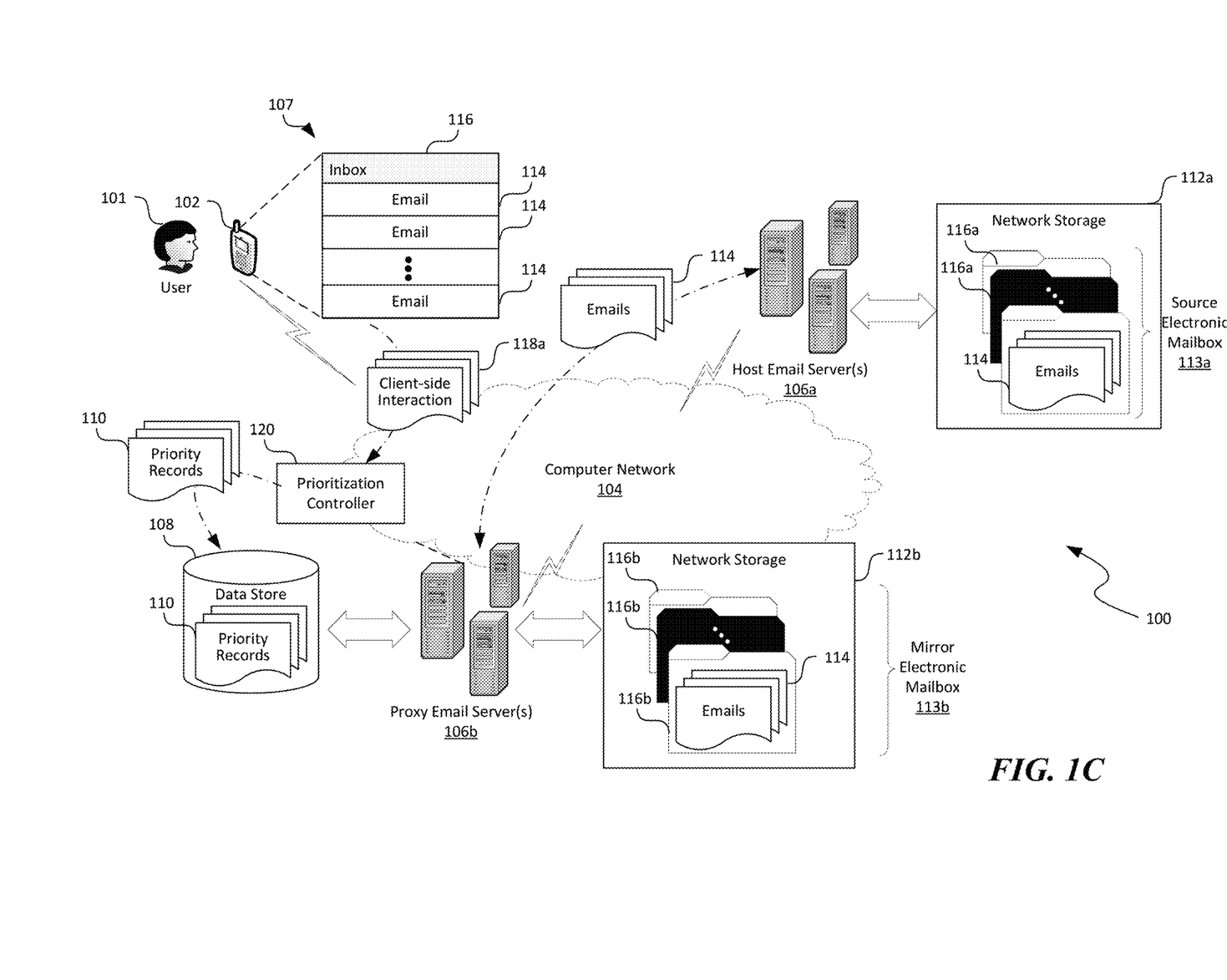

As shown in FIG. 1C, the prioritization controller 120 can also be configured to implement different synchronization rules and adjust the implemented synchronization rules for individual folders 116b in the mirror electronic mailbox 113b based on corresponding prioritization scores of these folders 116b. For example, the prioritization controller 120 can be configured to determine whether a prioritization score of a folder 116b exceeds a threshold. In response to determine that the prioritization score exceeds the threshold, the prioritization controller 120 can mark the folder 116b to be synchronized. Otherwise, the prioritization controller 120 can mark the folder 116b to be not synchronized (shown in FIG. 1C in reverse contrast for illustration purposes). In another example, in response to determine that the prioritization score exceeds the threshold, the prioritization controller 120 can mark the folder 116b to be synchronized at a higher frequency (e.g., once an hour) than a frequency (e.g., once a day) for other folders 116b with prioritization scores below the threshold. In further examples, the prioritization controller 120 can also be configured to sort the folders 116b into a priority sequence according to the prioritization scores and instruct the email servers to synchronize the folders 116b in the mirror electronic mailbox using the priority sequence. In yet further examples, the prioritization controller 120 can be configured to exclude or delay synchronization of folders 116b that continue to experience failures or other operational difficulties, such as failure to synchronize, high processing workload, etc.

Several embodiments of the disclosed technology can improve user experience when using the mobile app 107. By prioritizing synchronization of folders 116b using the client- and/or server-side interaction signals 118a and 118b, folders 116b most often used by the user 101 can be synchronized more frequent or faster than other folders 116b. As such, the folders 116b that are most often used can stay up to date with small or no synchronization delays. In addition, by not synchronizing certain folders 116b often unused by the user 101 for a long time, the host and proxy email servers 106a and 106b can save storage, computing, network, or other suitable types of resources at corresponding email servers 106a and 106b. Also, by synchronizing a reduced number of folders 116a and 116b, synchronization latencies of the folders 116b can also be reduced. As such, the mobile app 107 can appear to be more responsive than synchronizing all folders 116b. Example components of the prioritization controller 120 are described in more detail below with reference to FIG. 2 while adjustment of synchronization priorities is described below in more detail with reference to FIGS. 3A-3C.

Figure 2:
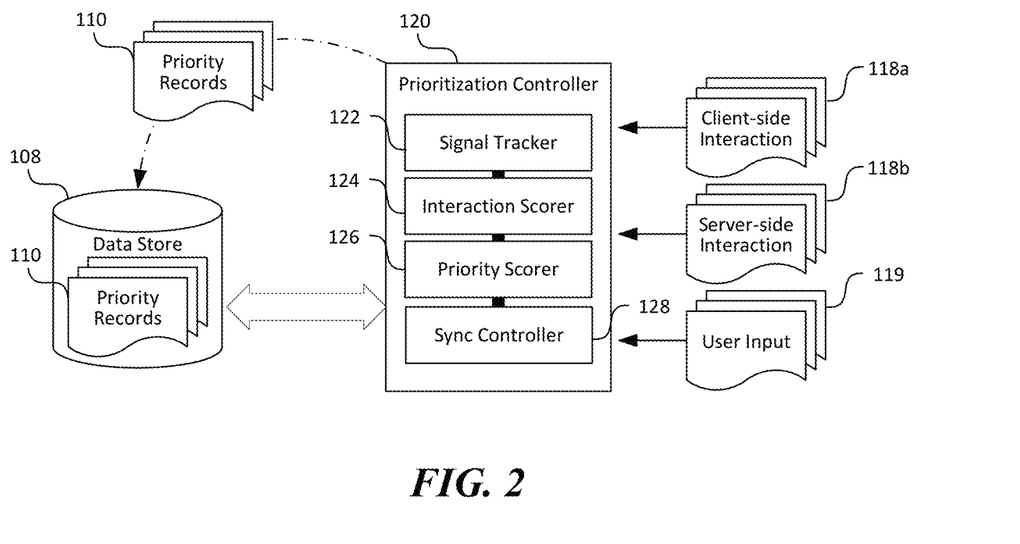
FIG. 2 is a schematic diagram illustrating certain hardware/software components of the computing system of FIG. 1 in accordance with embodiments of the disclosed technology.

FIG. 2 is a schematic diagram illustrating certain hardware/software components of the prioritization controller 120 in accordance with embodiments of the disclosed technology. In FIG. 2, only certain components of the computing system 100 of FIG. 1 are shown for clarity. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software.

Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the prioritization controller 120 can include a signal tracker 122, an interaction scorer 124, a prioritization scorer 126, and a sync controller 128 operatively coupled to one another. Though particular components of the prioritization controller 120 are shown in FIG. 2, in other embodiments, the prioritization controller 120 can also include network, database, input/output, or other suitable types of components in addition to or in lieu of those shown in FIG. 2. In further embodiments, certain components of the prioritization controller 120 may be combined into a single logic entity. For example, the interaction scorer 124 and the prioritization scorer 126 may be combined into a signal logic entity. In another example, the interaction scorer 124, the prioritization scorer 126, and the sync controller 128 can be combined into another single logic entity.

The signal tracker 122 can be configured to track client- and server-side interaction signals 118a and 118b (FIG. 1B). In certain embodiments, the signal tracker 122 can be configured to periodically poll the mobile app 107 (FIG. 1B) and the proxy email server 106b for detection of any of the example interactions discussed above with reference to FIGS. 1A-1C. In other embodiments, the signal tracker 122 can be configured to receive the client- and server-side interaction signals 118a and 118b transmitted by, for instance, an interaction agent on the mobile app 107 and/or on the proxy email server 108b. Upon receiving a client- or server-side interaction signals 118a and 118b, the signal tracker 122 can optionally store a copy of the received signal in, for instance, the data store 108 and provide an indication to the interaction scorer 124 for further processing.

The interaction scorer 124 can be configured to assign an interaction score to an interaction indicated in the received client- and server-side interaction signals 118a and 118b. In one embodiment, an administrator (not shown) can provide user input 119 that defines values of the interaction score assigned. In other embodiments, the interaction scorer 124 can be configured to assign the interaction score based on historical values, frequency of the interaction type, or other suitable criteria. In at least some examples, the interaction scorer 124 can be configured to adjust any previously assigned interaction scores as a function of time, frequency, recency, or other suitable criteria. Thus, in certain instances, as time elapses, the assigned interaction score to a tracked interaction (e.g., user selects an email folder) can continuously decrease until reaching a floor value (e.g., zero) or continue to negative numbers without being limited by a floor value. Upon assigning the interaction score, the interaction scorer 124 can forward the assigned interaction score to the prioritization scores 126 for further processing.

The prioritization scorer 126 can be configured to derive an overall prioritization score based on the assigned interaction scores. In certain embodiments, at least some of the assigned interaction scores can have corresponding weights toward the overall prioritization score. As such, an administrator or other suitable entities can adjust the weights, for instance, as user input 119, to emphasis importance of certain interaction signals. For example, an administrator may set higher weights for server-side interaction signals compared to client-side interaction signals 118a and 118b, or vice versa. In certain implementations, the prioritization scorer 126 can be configured to adjust the prioritization score in real time. As such, when an interaction signal is received, the prioritization scorer 126 can be configured to recalculate the prioritization score in response to receiving the interaction signal. In other implementations, the prioritization scorer 126 can be configured to adjust the prioritization score periodically or in other suitable manners. Upon obtaining the prioritization score, the prioritization scorer 126 can generate or update a priority record 110 corresponding to the folder 116*b* in the data store 108.

The sync controller 128 can be configured to perform synchronization control for the folders 116*b* in the mirror electronic mailbox 113*b*. In certain embodiments, the sync controller 128 can be configured to implement different synchronization rules for individual folders 116*b* based on corresponding prioritization scores of these folders 116*b*. For example, the sync controller 128 can be configured to determine whether a prioritization score of a folder 116*b* exceeds a threshold. In response to determine that the prioritization score exceeds the threshold, the sync controller 128 can mark the folder 116*b* to be synchronized. Otherwise, the sync controller 128 can mark the folder 116*b* to be not synchronized. In another example, in response to determine that the prioritization score exceeds the threshold, the sync controller 128 can mark the folder 116*b* to be synchronized at a higher frequency (e.g., once an hour) than a frequency (e.g., once a day) for other folder 116*b*s with prioritization scores below the threshold. In further examples, the sync controller 128 can also be configured to sort the folder 116*b*s into a priority sequence according to the prioritization scores and instruct the email servers to synchronize the folders 116*b* in the mirror electronic mailbox 113*b* using the priority sequence. In yet further examples, the sync controller 128 can be configured to exclude or delay synchronization of folders 116*b* that continue to experience operational difficulties, such as failure to synchronize, high processing workload, etc.

Figure 3A:
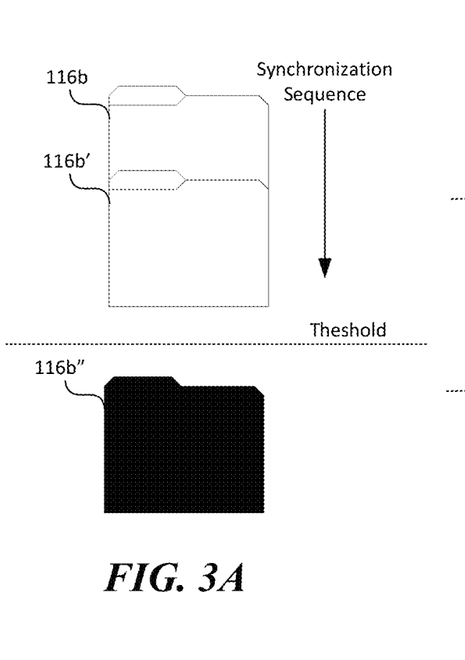
FIGS. 3A-3C are schematic diagrams illustrating example synchronization control of file folders in accordance with embodiments of the disclosed technology.

FIGS. 3A-3C are schematic diagrams illustrating synchronization control of file folders in accordance with embodiments of the disclosed technology. As shown in FIG. 3A, a first folder 116*b* and a second folder 116*b'* can have corresponding prioritization scores greater than a threshold while the third folder 116*b"* has a prioritization score that is below the threshold. As such, in certain implementations, the first and second folders 116*b* and 116*b'* can be marked as being synchronized while the third folder 116*b"* is marked as not to be synchronized. In other implementations, the first and second folders 116*b* and 116*b'* can be synchronized at a first frequency higher than a second frequency according to which the third folder 116*b"* is synchronized. In further implementations, the first and second folders 116*b* and 116*b'* can be sorted according to respective prioritization scores to generate a synchronization sequence according to which the first and second folders 116*b* and 116*b'* can be synchronized.

Figure 3B:
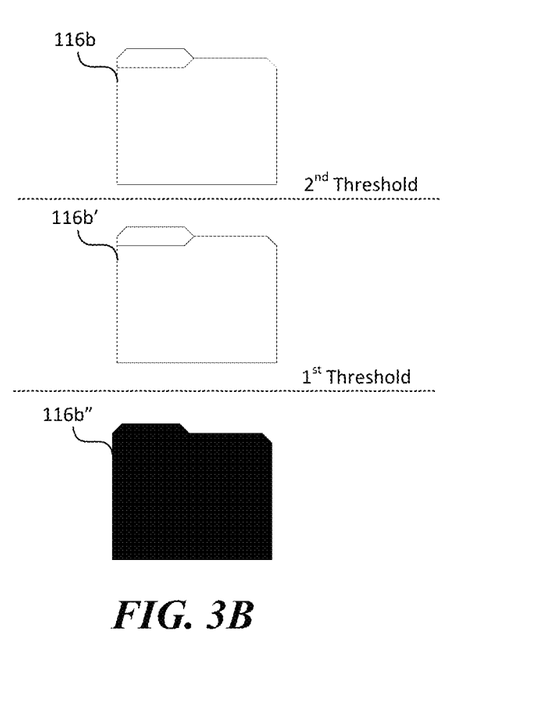

As shown in FIG. 3B, in further implementations, the first and second folders 116*b* and 116*b'* have respective prioritization scores higher than a first threshold while the third folder 116*b"* has a prioritization score lower than the first threshold. As such, the first and second folders 116*b* and 116*b'* can be marked as to be synchronized or synchronized at the first frequency while the third folder 116*b"* is marked as not to be synchronized or synchronized at a second frequency lower than the first frequency. As shown in FIG. 3B, upon determining that the first folder 116*b* has a prioritization score that is higher than a second threshold, the prioritization controller 120 (FIG. 1A) can mark the first folder 116*b* to be synchronized at a higher frequency than that of the second folder 116*b'*.

Figure 3C:
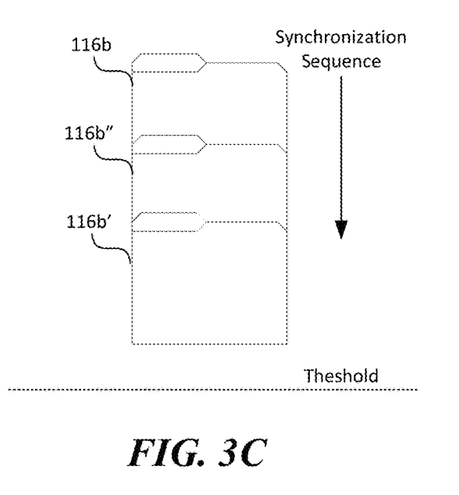

As shown in FIG. 3C, upon receiving another client- or server-side interaction signal 118*a* or 118*b* (FIG. 1B) corresponding to the third folder 116*b"*, the prioritization controller 120 can recalculate the prioritization score of the third folder 116*b"*. Upon determining that the new prioritization score is higher than the threshold, the prioritization controller 120 can mark the third folder 116*b"* as to be synchronized, to be synchronized at the first frequency, or sorting the folders 116*b*, 116*b'*, and 116*b"* to place synchronization of the third folder 116*b"* ahead of the second folder 116*b'*.

Figure 4A:
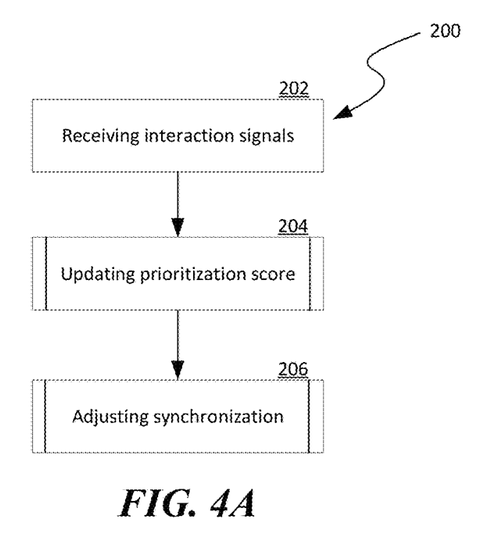
FIGS. 4A-4C are flowcharts illustrating example processes of synchronization control of file folders in accordance with embodiments of the disclosed technology.
Figure 4B:
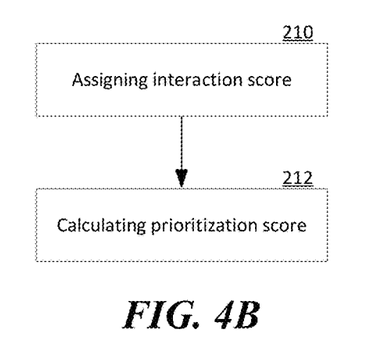
Figure 4C:
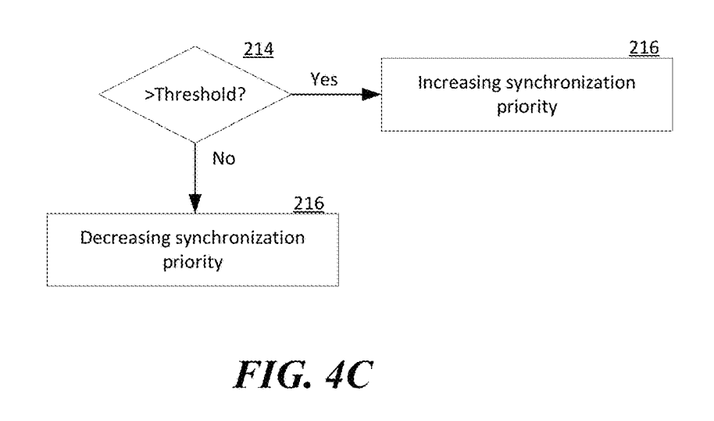

FIGS. 4A-4C are flowcharts illustrating example processes of synchronization control of file folders in accordance with embodiments of the disclosed technology. Though aspects of the processes are described below in the context of the computing system 100 in FIGS. 1A-1C, in other embodiments, the processes may be implemented in other computing systems with additional and/or different components.

As shown in FIG. 4A, a process 200 can include receiving interaction signals at stage 202. In certain embodiments, the interaction signals can include client-side interaction signals and/or server-side interaction signals such as those described above with reference to FIGS. 1A-1C. In other embodiments, the interaction signals can also include other suitable types of signals. The process 200 can then include updating a prioritization score of a folder corresponding to the received interaction signals at stage 204. Example operations of updating the prioritization score are described in more detail below with reference to FIG. 4B. The process 200 can then include adjusting synchronization of folders in an electronic mailbox at stage 206. Example operations of adjusting synchronization of folders are described in more detail below with reference to FIG. 4B.

As shown in FIG. 4B, operations of updating the prioritization score can include assigning an interaction score to a folder based on an interaction indicated in the received interaction signals at stage 210. The operations can then include calculating or recalculating a prioritization score based on the assigned interaction score at stage 212. Various examples of assigning an interaction score and calculating a prioritization score are described above with reference to FIGS. 1A-1C.

As shown in FIG. 4C, example operations of adjusting synchronization of folders can include a decision stage 214 to determine whether the calculated prioritization score exceeds a threshold. In response to determining that the calculated prioritization score exceeds the threshold, the operations can proceed to increasing a synchronization priority at stage 216. Otherwise, the operations can proceed to decreasing the synchronization priority at stage 216. Example techniques of increasing/decreasing synchronization priority based on the prioritization score are described above with reference to FIGS. 1A-1C.

Figure 5:
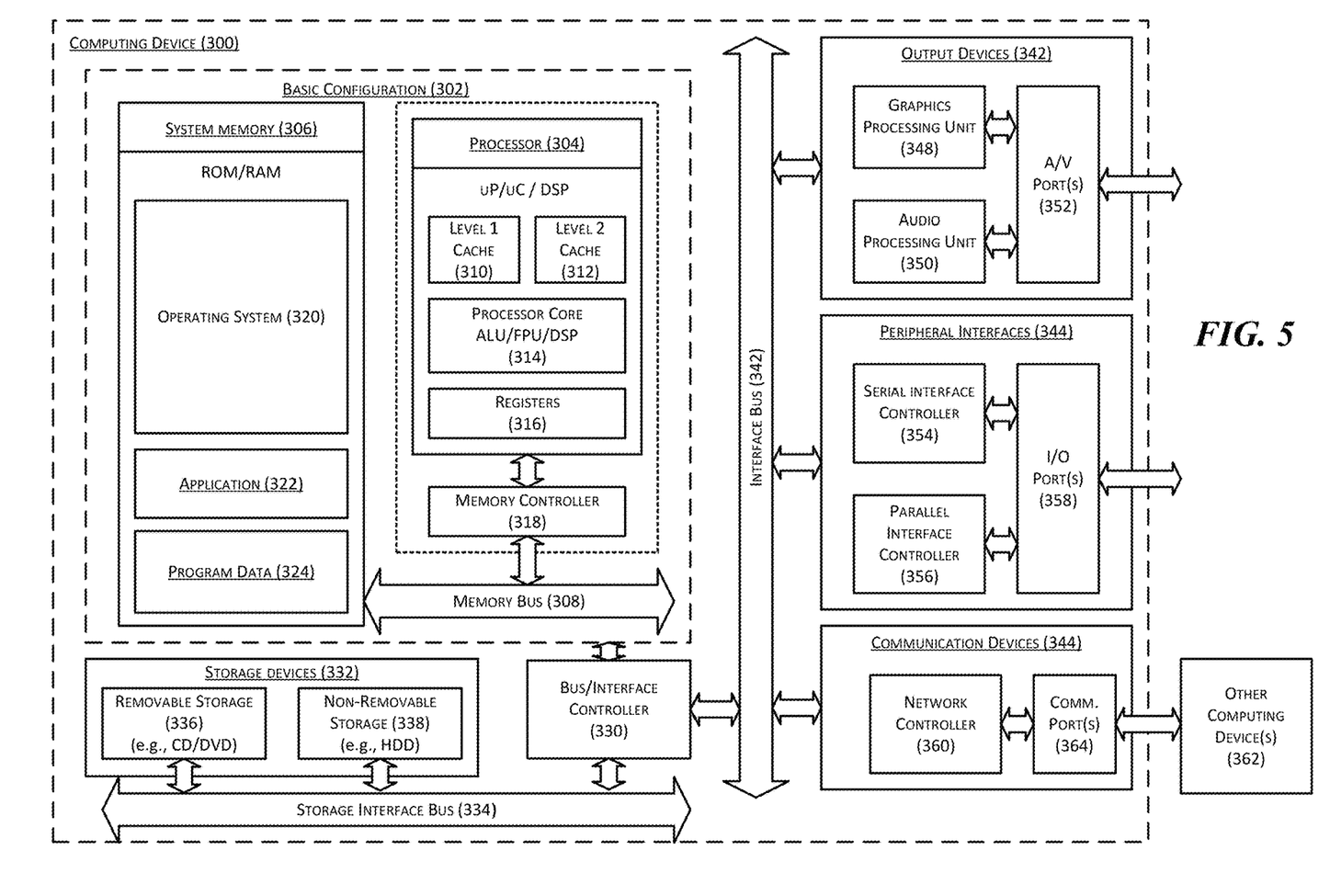
FIG. 5 is a computing device suitable for certain components of the computing system in FIG. 1.

FIG. 5 is a computing device 300 suitable for certain components of the computing system 100 in FIG. 1. For example, the computing device 300 can be suitable for the host or proxy email server 106*a* and 106*b* or the client device 102 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of synchronization control of folders containing emails in a first electronic mailbox hosted by a first server and folders in a second electronic mailbox hosted on a second server in a computing system, the first electronic mailbox being replicated from the second electronic mailbox, wherein the method comprising:
   receiving, by a processor, interaction signals;
   calculating, by the processor, prioritization scores for a first folder and a second folder based on the interaction signals, wherein a first prioritization score of the calculated prioritization scores for the first folder differs from a second prioritization score of the calculated prioritization scores for the second folder, and wherein the first folder and the second folder are folders from the first electronic mailbox;
   implementing, by the processor, a first synchronization rule for the first folder and a second synchronization rule for the second folder based on a difference in the first prioritization score and the second prioritization score;
   synchronizing, by the processor, the first folder at the first electronic mailbox hosted at the first server with another corresponding folder at the second electronic mailbox hosted at the second server according to the implemented first synchronization rule and the second folder at the first electronic mailbox with the another corresponding folder at the second electronic mailbox according to a the implemented second synchronization rule.

2. The method of claim 1, further comprising: receiving additional interaction signals indicating that a user has explicitly requested synchronization of the first folder or the second folder; recalculating the first prioritization score and the second prioritization score based on the additional interaction signals indicating that the user has explicitly requested synchronization of the first folder or the second folder; and implementing a new first synchronization rule for the first folder and a new second synchronization rule for the second folder based on the recalculated prioritization scores of the first folder and the second folder.

3. The method of claim 1, further comprising: receiving additional interaction signals indicating that a processing workload of the first folder or the second folder at the first server exceeds a threshold; recalculating the first prioritization score and the second prioritization score based on the additional interaction signals indicating that the processing workload of the first folder or the second folder at the first server exceeds the threshold; and implementing a new first synchronization rule for the first folder and a new second synchronization rule for the second folder based on the recalculated prioritization scores of the first folder and the second folder.

4. The method of claim 1, wherein calculating the prioritization scores for the first folder and the second folder based on the interaction signals includes: assigning a first score to interaction of the first folder and a second score to failure corresponding to the second folder; deriving the first prioritization score by summing the assigned first score with other scores assigned to additional interactions or failures corresponding to the first folder; and deriving the second prioritization score by summing the assigned second score with further scores assigned to additional interactions or failures corresponding to the second folder.

5. The method of claim 1, further comprising: subsequent to calculating the prioritization scores corresponding to the first folder and calculating the second prioritization score corresponding to the second folder, reducing the calculated first and second prioritization scores as a function of elapsed time.

6. The method of claim 1 wherein: the first synchronization rule indicates that the first folder is to be synchronized with the another corresponding folder at the second electronic mailbox; and the second synchronization rule indicates that the second folder is not to be synchronized with the another corresponding folder at the second electronic mailbox.

7. The method of claim 1, further comprising: the first synchronization rule indicates that the first folder is to be synchronized with the another corresponding folder at the second electronic mailbox at a first frequency; and the second synchronization rule indicates that the second folder is to be synchronized with the corresponding folder at the second electronic mailbox at a second frequency lower than the first frequency.

8. The method of claim 1, further comprising: sorting the first and second folders into a synchronization sequence according to the prioritization scores; and the first and second synchronization rules indicate that the first folder is to be synchronized with the another corresponding folder at the second electronic mailbox prior to synchronizing the second folder with the another corresponding folder at the second electronic mailbox.

9. The method of claim 1, wherein the interaction signals indicate an interaction of a user with an email in a first folder in the first electronic mailbox and a failure of performing a synchronization operation between the second folder in the first electronic mailbox at the first server and a corresponding folder of the second electronic mailbox at the second server.

10. A computing device for processing electronic messages, the computing device comprising: a processor; and a memory containing instructions executable by the processor to cause the computing device to:
receive interaction signals;
calculating prioritization scores for a first folder and a second folder based on the interaction signals, wherein a first prioritization score of the calculated prioritization scores for the first folder differs from a second prioritization score of the calculated prioritization scores for the second folder, and wherein the first folder and the second folder are folders from a first electronic mailbox;
implementing a first synchronization rule for the first folder and a second synchronization rule for the second folder based on a difference in the first prioritization score and the second prioritization score; and
synchronizing the first folder at the first electronic mailbox hosted at a first server with another corresponding folder at a second electronic mailbox hosted at a second server according to the implemented first synchronization rule and the second folder at the first electronic mailbox with the another corresponding folder at the second electronic mailbox according to the implemented second synchronization rule.

11. The computing device of claim 10, wherein the memory includes additional instructions executable by the processor to cause the computing device to: determine whether an elapsed time of a user interacting with an email in the first folder in the first electronic mailbox or interacting with the first folder directly exceeds a threshold; and in response to determining that the elapsed time exceeds the threshold, decreasing the first prioritization score by a preset amount.

12. The computing device of claim 10 wherein the memory includes additional instructions executable by the processor to cause the computing device to: receive additional data representing a signal indicating that a user has explicitly requested synchronization of the first folder;
increase the first prioritization score corresponding to the first folder based on the received signal indicating that the user has explicitly requested synchronization of the first folder; and
according to the increased first prioritization score and the second prioritization score, further increase a synchronization priority of the first folder relative to a synchronization priority of the second folder.

13. The computing device of claim 10, wherein the memory includes additional instructions executable by the processor to cause the computing device to:
receive additional interaction signals indicating that a processing workload of the first folder at the first server exceeds a threshold;
decrease the first prioritization score corresponding to the first folder based on the additional interaction signals indicating that the processing workload of the first folder at the first server exceeds the threshold; and
according to the decreased first prioritization score and the second prioritization score, decrease a synchronization priority of the first folder relative to a synchronization priority of the second folder.

14. The computing device of claim 10, wherein the memory includes additional instructions executable by the processor to cause the computing device to: receive additional interaction signals indicating that a processing workload of the second folder at the first server exceeds a threshold;
decrease the second prioritization score corresponding to the second folder based on the received additional interaction signals indicating that the processing workload of the second folder at the first server exceeds the threshold;
and according to the first prioritization score and the decreased second prioritization score, further increase a synchronization priority of the first folder relative to a synchronization priority of the second folder.

15. The computing device of claim 10, wherein the memory includes additional instructions executable by the processor to cause the computing device to: sort the first and second folders into a synchronization sequence according to the first and second prioritization scores; wherein to synchronize the first folder includes to synchronize the first folder at the first electronic mailbox hosted at the first server with the another corresponding folder at the second electronic mailbox hosted at the second server and the second folder at the first electronic mailbox with the corresponding folder at the second electronic mailbox according to the synchronization sequence.

16. The computing device of claim 10, wherein the interaction signals indicate an interaction of a user with an email in a first folder in the first electronic mailbox and a failure of performing a synchronization operation between the second folder in the first electronic mailbox at the first server and a corresponding folder of the second electronic mailbox at the second server.

17. A method of synchronization control of folders containing emails in a first electronic mailbox hosted by a first server and folders in a second electronic mailbox hosted on a second server in a computing system, the first electronic mailbox being replicated from the second electronic mailbox, wherein the method comprising:
receiving interaction signals indicating,
an interaction of a user with an email in a first folder in the first electronic mailbox or has interreacted with the first folder directly; and
a failure of performing a synchronization operation between a second folder in the first electronic mailbox at the first server and a corresponding folder of the second electronic mailbox at the second server;
upon receiving the interaction signals,
increasing a first synchronization priority of the first folder relative to a second synchronization priority of the second folder; and
synchronizing the first folder at the first electronic mailbox hosted at the first server with another corresponding folder at the second electronic mailbox hosted at the second server and the second folder at the first electronic mailbox hosted at the first server with the corresponding folder at the second electronic mailbox hosted at the second server according to the increased relative synchronization priority of the first folder over the second folder.

18. The method of claim 17, further comprising: receiving additional data representing a signal indicating that the user has explicitly requested synchronization of the first folder; and further increasing the synchronization priority of the first folder relative to a synchronization priority of the second folder.

19. The method of claim 17, further comprising: receiving additional data representing a signal indicating that the user has explicitly requested synchronization of the second folder; and decreasing the synchronization priority of the first folder relative to a synchronization priority of the second folder.

20. The method of claim 17, further comprising: sorting the first and second folders into a synchronization sequence according to a first and second scores; and wherein synchronizing the first folder includes synchronizing the first folder at the first electronic mailbox hosted at the first server with the another corresponding folder at the second electronic mailbox hosted at the second server and the second folder at the first electronic mailbox with the another corresponding folder at the second electronic mailbox according to the synchronization sequence.

\* \* \* \* \*